United States Patent
Baer

(10) Patent No.: US 10,715,652 B2
(45) Date of Patent: Jul. 14, 2020

(54) SOLUTION FOR CONTROLLING AN OPERATING MODE OF A MOBILE TERMINAL

(71) Applicant: Telia Company AB, Solna (SE)

(72) Inventor: Anders Baer, Arsta (SE)

(73) Assignee: TELIA COMPANY AB, Solna (SE)

( * ) Notice: Subject to any disclaimer, the term of this patent is extended or adjusted under 35 U.S.C. 154(b) by 0 days.

(21) Appl. No.: 15/405,995

(22) Filed: Jan. 13, 2017

(65) Prior Publication Data
US 2017/0208433 A1 Jul. 20, 2017

(30) Foreign Application Priority Data
Jan. 14, 2016 (EP) .................................... 16151242

(51) Int. Cl.
*H04M 1/725* (2006.01)
*H04W 4/029* (2018.01)
*H04M 1/67* (2006.01)
*H04W 4/80* (2018.01)
*H04W 8/18* (2009.01)
*H04W 52/02* (2009.01)
*H04W 60/04* (2009.01)
*H04W 24/02* (2009.01)

(52) U.S. Cl.
CPC ......... *H04M 1/72572* (2013.01); *H04M 1/67* (2013.01); *H04M 1/72577* (2013.01); *H04W 4/029* (2018.02); *H04W 4/80* (2018.02); *H04W 8/183* (2013.01); *H04W 52/0251* (2013.01); *H04W 24/02* (2013.01); *H04W 60/04* (2013.01); *Y02D 70/142* (2018.01); *Y02D 70/144* (2018.01); *Y02D 70/164* (2018.01); *Y02D 70/166* (2018.01)

(58) Field of Classification Search
CPC ...... H04W 24/02; H04W 4/008; H04W 60/04
See application file for complete search history.

(56) References Cited

U.S. PATENT DOCUMENTS 7,349,705 B1 * 3/2008 Holland ................ G01S 5/0027
455/456.1
8,467,770 B1 * 6/2013 Ben Ayed ............. H04L 63/107
455/41.1
(Continued)

FOREIGN PATENT DOCUMENTS

| CN | 104182707 A | 12/2014 |
|---|---|---|
| WO | 2013/011512 A1 | 1/2013 |
| WO | 2015/004415 A1 | 1/2015 |

OTHER PUBLICATIONS

European Search Report, dated Jul. 12, 2016, from corresponding European Patent Application.

(Continued)

*Primary Examiner* — Jaime M Holliday
(74) *Attorney, Agent, or Firm* — Young & Thompson

(57) ABSTRACT

The invention relates to a solution for setting a mobile terminal to a predetermined operating mode, wherein it is determined if the mobile terminal resides out of a predetermined area and in response to a detection that the mobile terminal resides out of the area a profile is activated. The activation of the profile is configured to limit user access to the mobile terminal and to confirm that a data connection is active between the mobile terminal and a communication network. The invention also relates to a mobile terminal performing the method.

13 Claims, 2 Drawing Sheets

(56) References Cited

U.S. PATENT DOCUMENTS

| | | | | |
|---|---|---|---|---|
| 9,417,313 | B2* | 8/2016 | Smith | H04L 65/1006 |
| 2002/0137524 | A1* | 9/2002 | Bade | H04W 12/08 |
| | | | | 455/456.2 |
| 2005/0221841 | A1* | 10/2005 | Piccionelli | H04W 48/04 |
| | | | | 455/456.3 |
| 2011/0130117 | A1* | 6/2011 | Fan | H04M 15/00 |
| | | | | 455/411 |
| 2012/0129545 | A1 | 5/2012 | Hodis et al. | |
| 2014/0013136 | A1 | 1/2014 | Dadu et al. | |
| 2014/0335902 | A1 | 11/2014 | Guba et al. | |
| 2017/0134906 | A1* | 5/2017 | Yoo | H04W 4/027 |
| 2017/0164291 | A1* | 6/2017 | Ludwig | H04W 52/0254 |

OTHER PUBLICATIONS

Office Action issued in European Patent Application No. 16 151 242.1 dated Mar. 30, 2020.

* cited by examiner

SOLUTION FOR CONTROLLING AN OPERATING MODE OF A MOBILE TERMINAL

TECHNICAL FIELD

The invention relates generally to a technical field of mobile communication. More particularly, the invention relates to controlling an operating mode of a mobile terminal.

BACKGROUND

Mobile terminals are devices which are equipped with cooperating entities which enable wireless communication through a mobile communication network. Additionally, the mobile terminals are equipped with devise and applications by means of which the user of the mobile terminal may perform a variety of tasks, such as generate and access to data, such as personal content like photos and documents. Some examples of mobile terminals are mobile phones, tablet computers and laptop computers among other similar.

As the users carry the mobile terminals with them there is a risk that the mobile terminal gets lost e.g. by a theft. Nowadays the loss of the terminal itself, i.e. the hardware, is less important than the loss of the content residing in a memory of the mobile terminal. However, the return of content is difficult with the known solutions especially due to reason that in the loss situation the subscription residing in the mobile terminal is typically inactivated by the telecom operator in order to prevent further damages. Alternatively or in addition, some existing solutions suggest that data content is to be deleted in the mobile terminal by e.g. an application controlling at least partly a security of the mobile terminal.

In addition, one challenge is that many times the loss of the mobile terminal happens when the user is traveling. During the traveling the data connection may be disabled by default because a generation of costs due to data exchange when roaming is desirable by the user. Hence, there is no way to access the data content residing in the mobile terminal if the mobile terminal is lost.

Hence, there is a need to establish a solution that mitigates the above described disadvantages of the existing solutions and improve a capability to return the data content to the user, or the owner, of the mobile terminal.

SUMMARY

The following presents a simplified summary in order to provide basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

An objective of the invention is to present a method and a mobile terminal for providing security to user of a mobile terminal. Another objective of the invention is that the method and the mobile terminal enable setting an operating mode to the mobile terminal in response to a triggering event.

The objectives of the invention are reached by a method and a mobile terminal as defined by the respective independent claims.

According to a first aspect, a method for setting a mobile terminal to a predetermined operating mode is provided, the method comprising: determining if the mobile terminal resides out of a predetermined location, and in response to a determination that the mobile terminal resides out of the predetermined area activating a profile in the mobile terminal wherein the activation of the profile is configured to limit user access to the mobile terminal and to confirm that data connection is active between the mobile terminal and a communication network.

The activation of the profile may further be configured to set the mobile terminal in a power saving mode. The activation of the profile may also be configured to shut-down at least one application running in the mobile terminal at the time when the profile is activated.

The confirmation that the data connection is active may comprise steps of: detecting if the data connection is active, and in response to detection that the data connection is inactive initiating the data connection.

The data connection may be established through one of the following: mobile communication network, wireless local area network. The establishment of the data connection through a mobile communication network may further comprise a negotiation of the data connection between a home network and a visited network.

The determination if the mobile terminal resides out of the predetermined area may be performed by: determining a location of the mobile terminal with at least one of the following: mobile network based positioning system, satellite based positioning system; and comparing the determined position with a predetermined area.

Moreover, the determination if the mobile terminal resides out of the predetermined area may be performed by: detecting if the mobile terminal is within a vicinity of a device, wherein the vicinity of the device is defined by a short-range communication technology coupling the mobile terminal and the device communicatively with each other, and in response to a detection that a short-range communication connection does not exist concluding that the mobile terminal resides out of the predetermined area.

The short-range communication technology may be one of the following: Bluetooth, Near Field Communication.

According to a second aspect, a mobile terminal is provided, the mobile terminal comprising at least one processor; and at least one memory including computer program code; wherein the at least one memory and the computer program code configured to, with the at least one processor, cause the mobile terminal to perform: determine if the mobile terminal resides out of a predetermined location, and in response to a determination that the mobile terminal resides out of the predetermined area activate a profile in the mobile terminal wherein the activation of the profile is configured to limit user access to the mobile terminal and to confirm that data connection is active between the mobile terminal and a communication network.

The activation of the profile may cause the mobile terminal to set in a power saving mode. The activation of the profile may cause the mobile terminal to shutdown at least one application running in the mobile terminal at the time when the profile is activated.

The mobile terminal may be configured to confirm that the data connection is active by: detecting if the data connection is active, and in response to detection that the data connection is inactive initiating the data connection.

The mobile terminal may be configured to determine if the mobile terminal resides out of the predetermined area by: determining a location of the mobile terminal with at least one of the following: mobile network based positioning system, satellite based positioning system; and comparing the determined position with a predetermined area stored in the memory of the mobile terminal.

Moreover, the mobile terminal may be configured to determine if the mobile terminal resides out of the predetermined area by: detecting if the mobile terminal is within a vicinity of a device, wherein the vicinity of the device is defined by a short-range communication technology coupling the mobile terminal and the device communicatively with each other, and in response to a detection that a short-range communication connection does not exist concluding that the mobile terminal resides out of the predetermined area.

Various exemplifying and non-limiting embodiments of the invention both as to constructions and to methods of operation, together with additional objects and advantages thereof, will be best understood from the following description of specific exemplifying and non-limiting embodiments when read in connection with the accompanying drawings.

The verbs "to comprise" and "to include" are used in this document as open limitations that neither exclude nor require the existence of unrecited features. The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF FIGURES

Exemplifying and non-limiting embodiments of the invention and their advantages are explained in greater detail below in the sense of examples and with reference to the accompanying drawings, in which.

DESCRIPTION OF THE EXEMPLIFYING EMBODIMENTS

The specific examples provided in the description given below should not be construed as limiting the scope and/or the applicability of the appended claims. Lists and groups of examples provided in the description given below are not exhaustive unless otherwise explicitly stated.

Figure 1:
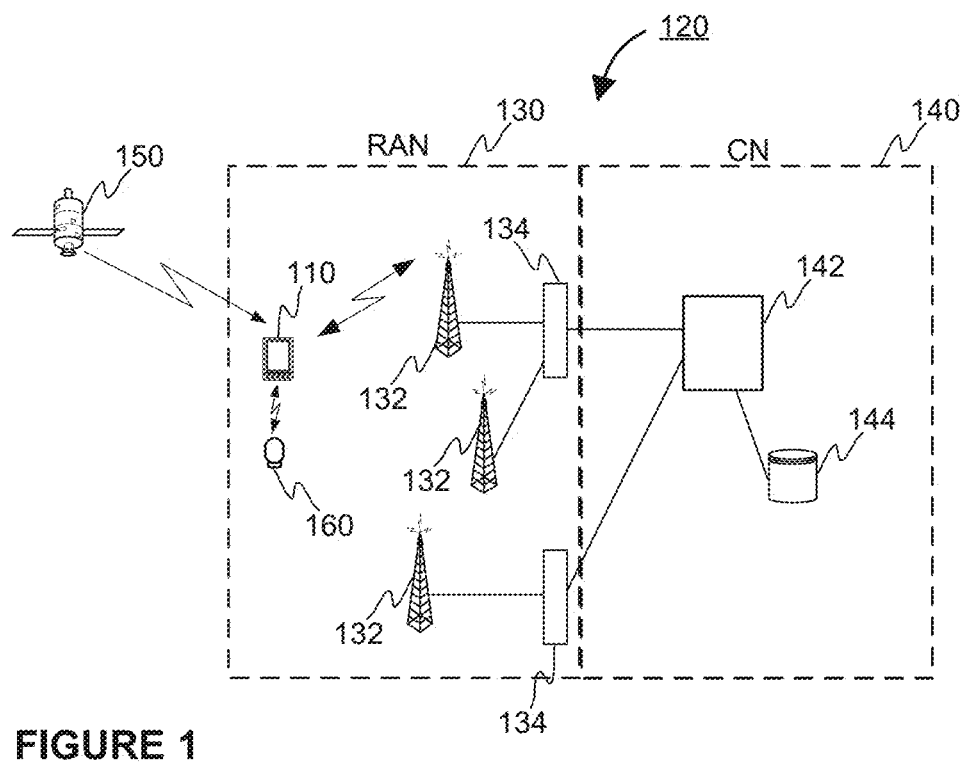
FIG. 1 shows a schematic illustration of an exemplified environment in which the present invention is applied.

FIG. 1 schematically illustrates an environment of the present invention. A mobile terminal 110 resides on an area of a mobile communications network 120 providing services to the mobile terminal 110. The mobile communication network 120 may comprise a radio access network (RAN) 130 and a core network (CN) 140, for example. The radio access network 130 comprises base stations 132, such as Node Bs, that are coupled to core network 140 elements through one or more base station controllers 134. The base station controllers 134 are configured to control the operation of base stations. The control comprises, but is not limited to, allocation of radio channels, receive measurements from the mobile terminals and control handovers between the base stations. The core network 140, in turn, comprises mobility management entity 142, such as Mobile Switching Centre, and one or more registers 144, such as Home Location Register (HLR) and/or Visitor Location Register (VLR). The mobility management entity 142 is configured to have at least partial responsibility of some core operations of the mobile communication network, such as security and authentication related tasks as well as call management related operations, among others. The registers, in turn, are configured to store either permanently or temporarily subscriber and user related information as well as location related information of the subscriber as well as other in-formation. FIG. 1 does not necessarily disclose all relevant nodes and elements needed for operating the mobile communication network.

The mobile terminal 110 may be equipped with a subscriber identity module (SIM) that provides an access to the mobile communication network and is needed for security related tasks among other tasks. The subscriber identity module may be implemented with a smart card only or partly or in full with software.

The mobile terminal 110 may also utilize resources of another mobile communication network than the one into which the subscription belongs to. Such a situation is called roaming. In such a situation the network in which the mobile terminal is roaming may communicate with the home network of the mobile terminal i.e. subscription in order to provide and receive necessary information for the wireless communication.

Further, a location of the mobile terminal 110 may be determined with accuracy defined by the system used for the determination of the location. The determination of the location may e.g. be performed by means of information provided by the mobile communication network 120 or by any other positioning system, such as satellite based system like GPS (Global Positioning System). In case of the location of the mobile terminal 110 is determined by means of information provided by the mobile communication network 120 the network 120 may send, or broadcast, position related information that may be used by the mobile terminal 110 for determining its location within the network. In case of GPS system the mobile terminal may receive information broadcast by a necessary number of satellites 150, such as four, on the basis of which the mobile terminal 110 may determine its position. The broadcast information may e.g. be time information and a position of a satellite in question that is compared to an internal time signal, or a deviation of it from true time. Inputting these pieces of information to equation the positional information, i.e. geographical location, of the mobile terminal 110 may be determined in a known manner. Moreover, in some implementation of the present invention the determination of the location of the mobile terminal 110 may be based on a determination if the mobile terminal resides in a home network or is roaming in some other network i.e. in a visited network. The determination between the home and the visited network may e.g. be based on detection that so called a roaming SMS is received in the mobile terminal when the device is activated in a non-home network. The detection may be based on an analysis of the sender of the message and/or to an analysis of the content of the message from which it is possible to conclude that the mobile terminal resides in a non-home network.

According to some further embodiment of the invention the determination of the location may be implemented locally within the user vicinity. As the mobile terminals 110 have nowadays more and more short-range communication means, such as Bluetooth modem and/or Near Field Communication (NFC) unit, the determination if the mobile terminal 110 resides in an acceptable location or not may be implemented, according to an embodiment of the invention may be implemented by utilizing the short-range communication means. Namely, it may be arranged that the user of the mobile terminal also carries another device (referred with 160 in FIG. 1) that is communicatively coupled with the mobile terminal 110 by means of the short-range communication technology. For example, the mobile terminal 110 may be equipped with a NFC reader that is configured to detect a NFC tag arranged in the device 160 when the mobile terminal 110 and the device 160 are in an operational vicinity of the NFC technology. If the mobile terminal 110 is taken outside the operational area of the NFC technology from the device 160, the NFC reader is configured to generate a signal in the mobile terminal 110 for a further use, as will be explained. Alternatively or in additional, both the mobile terminal 110 and the device 160 may be equipped with Bluetooth modem and being coupled to each other through the Bluetooth. Again, if the mobile terminal 110 is taken outside the range of the Bluetooth technology, the mobile terminal 110 may detect it from a generated signal of the Bluetooth modem due to the lost connection to the device 160. As said the utilization of the short-range communication provides a further way to detect if the mobile terminal resides in a predetermined location or not. As an example, the device 160 may be attached to a keyring which is usually carried with the user together with the phone. Alternatively or in addition, it may be embedded in clothing.

Figure 2:
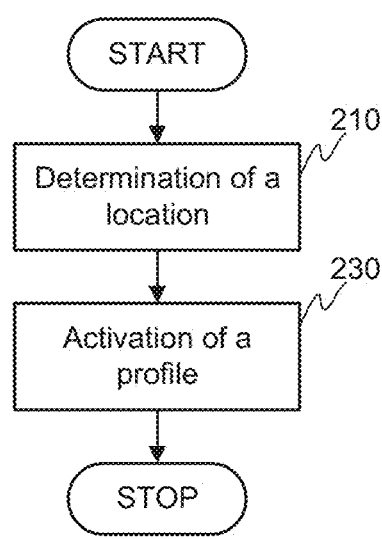
FIG. 2 shows a schematic illustration of a method according to an embodiment of the invention.

FIG. 2 schematically illustrates a method according to the invention. In the method a mobile terminal is configured to determine its location 210. The location may be determined e.g. at least in one of the above described manner by the mobile terminal 110 e.g. in a cooperation of any other entity. The location determination 210 comprises, in one embodiment of the invention, a sub-phase in which the determined location information is compared to predetermined location information accessible by the mobile terminal. The predetermined location information may e.g. be stored in a memory of the mobile terminal or in a database residing in a network accessible by the mobile terminal 110. The comparison may indicate that the mobile terminal 110 may reside in the predetermined location or outside it. In response to a determination that the mobile terminal 110 does not reside in the predetermined location a specific profile is activated 230 in the mobile terminal 110. As a result, the mobile terminal is set to a predetermined operating mode. The comparison may refer, in the context of short-range communication, to a step in which it is compared if there exists a short-range connection between the mobile terminal 110 and the device 160 or not.

The purpose of the determination of the location and especially the determination if the determined location matches with the predetermined location, or area, is to understand if the mobile terminal 110 resides in an acceptable location or not. In case the mobile terminal 110 does not reside in a predetermined location, i.e. acceptable location, the specific profile is activated. This is because the mobile terminal may have been stolen and taken to such an area which is not predetermined.

Figure 3:
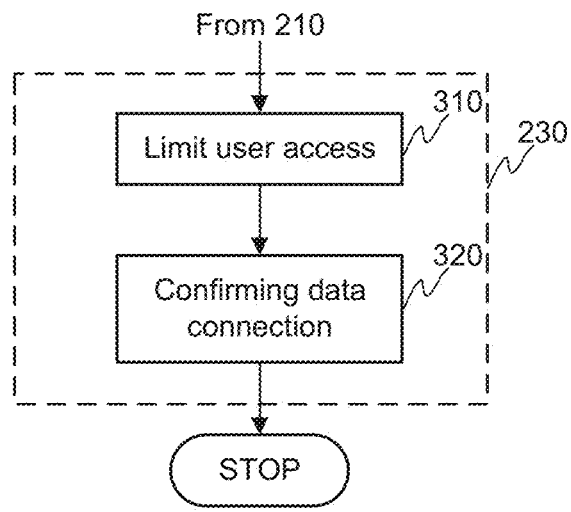
FIG. 3 shows a schematic illustration of some further aspects of the method according to an embodiment of the invention.

FIG. 3 schematically illustrates some further aspects of the method relating to the activation of the profile 230. Namely, when the determination is made that the mobile terminal 110 does not reside in a predetermined area and the profile is activated, the selection of the profile may cause the mobile terminal 110 to operate in the manner as schematically illustrated in FIG. 3. Firstly, the mobile terminal 110 is set to a mode that it limits user access to the device 310. According to a first embodiment of the invention the user access is limited 310 by disabling at least part of the I/O (Input/Output) devices in the terminal. At least an input device controlling a power off of the mobile terminal 110 is disabled in order to prevent the possessor of the mobile terminal 110 to shut-down the terminal. Additionally, other input and output devices may be disabled so that the possessor cannot interact with the mobile terminal. According to another exemplified embodiment the mobile terminal may be set to a mode that it requests the possessor to input a security code, such as PIN code, in the device. In other words, at least one input device is set operative by means of which the possessor of the terminal may input information. In this case at least the power off of the mobile terminal is disabled. Some non-limiting examples of the input devices that may be set operative when the specific profile is set on are keyboard, one or more buttons, microphone, touch screen. Generally speaking the I/O devices implemented in the mobile terminal 110 may be one or more buttons, one or more keyboards, one or more microphones, one or more displays, one or more touch screens, one or more speakers, one or more sensors either alone or in combination with others. The list does not necessarily comprise all possible I/O devices.

Moreover, a status of a data connection in the mobile communication network is configured to be checked when the specific profile is activated. In other words, it is confirmed that the data connection is active 320. Hence, the confirmation may comprise that if a check turns out that the data connection is already active i.e. the data connection may be used, its status is maintained. Alternatively or in addition, the confirmation of the data connection 320 may comprise a detection that the data connection is inactive and in response to such detection the data connection to the network is activated. The activation may be performed so that the mobile terminal 110 is instructed to initiate, i.e. activate, a PDP context towards the mobile communication network, for example. In some embodiment of the invention the establishment, i.e. activation, of the data connection may be performed through a wireless local area network if an open WLAN network is available.

The limitation of the user access to the mobile terminal 310 and the confirmation of the data connection 320 may be performed consecutively to each other or at least partly concurrently in the mobile terminal 110. In case these steps are performed consecutively the user access is preferably limited 310 first because then the possessor of the mobile terminal 110 is prevented to take any actions with the mobile terminal 110 e.g. as regards to connections to and from the mobile terminal 110.

The above described method according to the invention is advantageous e.g. in a situation that the mobile terminal gets stolen. The thief may carry the phone out from a predetermined area and this activates the specific profile in the mobile terminal having at least the above described features. As a result the thief cannot access the mobile terminal but there is an active data connection from the mobile terminal to the network. Such a status of the mobile terminal 110 enables an access to the mobile terminal from a network side and, hence, data content from the mobile terminal may be uploaded to a network node through the data connection and return to the real owner of the mobile terminal 110. The initiation of the access may be performed so that a message, or any other signal, may be transmitted from the network side towards the mobile terminal which message comprises necessary information, such as a predetermined format, by means of which the data transfer, i.e. upload of data, may be initiated.

Some aspects of the present invention relate to maintenance of the access to the mobile terminal 110 through the data connection as long as possible. This may be at least partly achieved by consuming energy stored in the battery of the mobile terminal 110 optimally when the specific profile is set active in the mobile terminal 110. Hence, a further embodiment of the invention may comprise a step in which the mobile terminal is set to a power saving mode. This may comprise that the operational efficiency of devices in the mobile terminal 110 are optimized. This may mean, but is not limited to, that, for example, a brightness of a display is set low and the CPU speed may be set low. Moreover, the mobile terminal 110 may be instructed to shut-down any unnecessary applications being executed in the mobile terminal 110. Especially, the user applications, such as social media applications or communication related applications may be shut-down.

Figure 4:
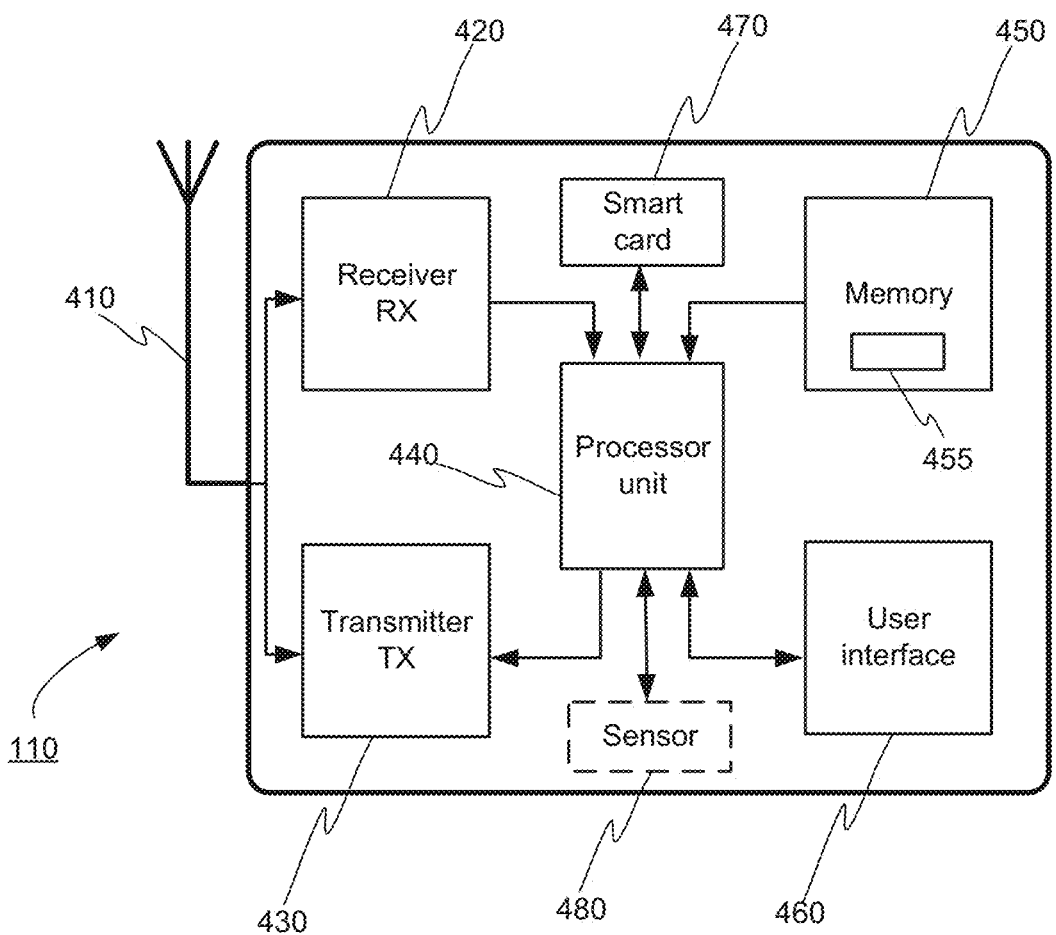
FIG. 4 shows a schematic illustration of a mobile terminal according to an embodiment of the invention.

FIG. 4 illustrates an example of a mobile terminal 110 relating to the invention. The mobile terminal 110 comprises multiple units, or devices, as depicted in FIG. 4. For example, the mobile terminal 110 may comprise, but it is not limited to these only, the following units: one or more antennas 410; one or more receivers 420; one or more transmitters 430; one or more processors 440; one or more memories 450; one or more user interface units 460 that may be also known as I/O devices as introduced earlier; one or more smart cards 470, such as SIM; and one or more sensors 480, such as temperature, moisture or motion sensors. The receivers 420 and the transmitters 430 comprise means for coupling to one or more mobile communication networks as well as means for implementing any short-range communication technology, such as Bluetooth and/or NFC, in order to operate as described.

The implementation of the present invention as described above may be arranged so that application software 455 with necessary parameters is stored in the memory 450 and when the application software is executed by the at least one processor 440 the mobile terminal 110 is caused to perform as described above. In other words, the application software receives as input location information, or at least pieces of information by means of which the location may be determined and the location is compared to stored information i.e. predetermined location in-formation. If the outcome of the comparison indicates a mismatch, the application software is configured to generate at least one signal in order to control one or more devices to bring the device in a state as known the specific profile in this description. In other words, at least some I/O devices may be disabled in order to limit the possessor access to the mobile terminal and at least one device configured to be involved in the execution of the data connection, such as a data modem comprising a receiver and transmitter, is confirmed to be in an active mode. The application software may also be arranged to execute other tasks, as described above. For example, the application software may control a touch screen to prompt possessor of the mobile terminal to input a security code and to obtain the input information from the touch screen for checking.

Some aspects of the invention relate to the application software in a sense that it may be configured, when executed by a processor, to receive an indication that defines the predetermined location wherein the specific profile shall not be activated. The indication may be input by the user of the mobile terminal 110, or the application software may be configured to provide a map though which the user may select the predetermined location or locations. Alternatively or in addition, the pre-determined location may be defined by an external entity, such as the telecom operator providing the telecom services to the user with the SIM card or any other entity. The information, or data, on the predetermined location may be transmitted to the mobile terminal 110 through a mobile communication network which information is to be stored in the memory 450 of the mobile terminal 110 to be used by the application software.

Some aspects of the invention may relate to a situation that a specific profile is activated but it cannot be confirmed that the data connection is active. In other words, it turns out that the data connection cannot be established. Such a situation may be if the mobile terminal 110 is equipped with so called pre-paid SIM card having no credit, or alternatively the roaming network does not enable the data connection for any other reason. In such a situation the data connection may be established under a control of home network. Since the activation of the mobile terminal 110 in a visited network generates signaling between the visited network and the home network it may be arranged that the home network is configured to establish a forced connection to a network of a network operator with whom the home network operator has a contract. The home network may negotiate and instruct the contract operator to establish the data connection towards the subscription in the mobile terminal 110 in order to implement the invention as described. This kind of procedure is advantageous in a sense that the home network does not cancel the data connection establishment due to missing credit in the pre-paid subscription.

The specific examples provided in the description given above should not be construed as limiting the applicability and/or the interpretation of the appended claims. Lists and groups of examples provided in the description given above are not exhaustive unless otherwise explicitly stated.

The invention claimed is:

1. A method for setting a mobile terminal to a predetermined operating mode, the method comprising:
   determining whether or not the mobile terminal resides out of a predetermined location;
   when the mobile terminal is determined to reside out of the predetermined area, activating a profile in the mobile terminal to limit user access to the mobile terminal and to set the mobile terminal to a power saving mode in which a shutdown of one or more applications is caused;
   determining, when the profile is activated, whether or not a data connection is active between the mobile terminal and a communication network in order to access the mobile terminal to initiate data transfer from the mobile terminal to the communication network; and
   (i) when it is determined that the data connection is active, the active data connection is maintained, and
   (ii) when it is determined that the data connection is inactive, the data connection is activated.

2. The method of claim 1, wherein the data connection is established through one of the following: a mobile communication network and a wireless local area network.

3. The method of claim 2, wherein the establishment of the data connection through the mobile communication network includes a negotiation of the data connection between a home network and a visited network.

4. The method of claim 1, wherein the determination whether or not the mobile terminal resides out of the predetermined area is performed by:
   determining a location of the mobile terminal with at least one of the following: a mobile network based positioning system and a satellite based positioning system, and comparing the determined position with a predetermined area.

5. The method of claim 1, wherein the determination whether or not the mobile terminal resides out of the predetermined area is performed by:
  detecting whether or not the mobile terminal is within a vicinity of a device, the vicinity of the device being defined by a short-range communication technology coupling the mobile terminal and the device communicatively with each other, and
  in response to a detection that a short-range communication connection does not exist, concluding that the mobile terminal resides out of the predetermined area.

6. The method of claim 5, wherein the short-range communication technology is one of the following: Bluetooth and Near Field Communication.

7. The method of claim 1, wherein an operational efficiency of at least one device in the mobile terminal is optimized in the power saving mode.

8. The method of claim 7, wherein the at least one device includes a display, and the power saving mode sets a brightness of the display low.

9. The method of claim 7, wherein the at least one device includes a central processing unit (CPU), and the power saving mode lowers a speed of the CPU.

10. The method of claim 1, wherein the one or more applications that are caused to be shut down in the power saving mode are social media applications and communication-related applications.

11. A mobile terminal comprising:
  at least one processor; and
  at least one memory including computer program code,
  wherein the at least one memory and the computer program code are configured to, with the at least one processor, cause the mobile terminal to perform:
    determining whether or not the mobile terminal resides out of a predetermined location,
    when the mobile terminal is determined to reside out of the predetermined area, activating a profile in the mobile terminal to limit user access to the mobile terminal and to set the mobile terminal to a power saving mode in which a shutdown of an application is caused,
    determining, when the profile is activated, whether or not a data connection is active between the mobile terminal and a communication network in order to access the mobile terminal to initiate data transfer from the mobile terminal to the communication network, and
    (i) when it is determined that the data connection is active, the active data connection is maintained, and
    (ii) when it is determined that the data connection is inactive, the data connection is activated.

12. The mobile terminal of claim 11, wherein the mobile terminal is configured to determine whether or not the mobile terminal resides out of the predetermined area by:
  determining a location of the mobile terminal with at least one of the following: a mobile network based positioning system and a satellite based positioning system, and
  comparing the determined position with a predetermined area stored in the memory of the mobile terminal.

13. The mobile terminal of claim 11, wherein the mobile terminal is configured to determine whether or not the mobile terminal resides out of the predetermined area by:
  detecting when the mobile terminal is within a vicinity of a device, the vicinity of the device being defined by a short-range communication technology coupling the mobile terminal and the device communicatively with each other, and
  in response to detecting that a short-range communication connection does not exist, concluding that the mobile terminal resides out of the predetermined area.

* * * * *